United States Patent
Wushour et al.

(10) Patent No.: US 10,613,803 B2
(45) Date of Patent: Apr. 7, 2020

(54) DRONE DELIVERY OF ON-DEMAND PRINTED MATTER

(71) Applicant: KYOCERA Document Solutions Inc., Chuo-Ku, Osaka (JP)

(72) Inventors: Dilinur Wushour, Clayton, CA (US); Jacek Joseph Matysiak, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/058,967

(22) Filed: Aug. 8, 2018

(65) Prior Publication Data

US 2020/0050408 A1 Feb. 13, 2020

(51) Int. Cl.
*G06F 3/12* (2006.01)
*B64C 39/02* (2006.01)

(52) U.S. Cl.
CPC .......... *G06F 3/1206* (2013.01); *B64C 39/024* (2013.01); *G06F 3/1204* (2013.01); *G06F 3/126* (2013.01); *G06F 3/1238* (2013.01); *G06F 3/1285* (2013.01); *G06F 3/1292* (2013.01); *B64C 2201/08* (2013.01); *B64C 2201/128* (2013.01); *B64C 2201/145* (2013.01)

(58) Field of Classification Search
None
See application file for complete search history.

(56) References Cited

U.S. PATENT DOCUMENTS

| | | | |
|---|---|---|---|
| 9,110,469 B2 | 8/2015 | Yamamoto | |
| 2007/0146780 A1* | 6/2007 | Miwa | B42C 19/02 358/1.15 |
| 2008/0115207 A1* | 5/2008 | Go | G06F 21/608 726/17 |
| 2015/0153981 A1* | 6/2015 | Iwasaki | G06F 3/1238 358/1.14 |
| 2016/0068261 A1 | 3/2016 | Niederberger | |
| 2016/0239804 A1 | 8/2016 | Buchmueller | |
| 2017/0038780 A1* | 2/2017 | Fandetti | G05D 1/104 |
| 2018/0058864 A1* | 3/2018 | Lection | G06Q 30/0631 |

FOREIGN PATENT DOCUMENTS

| | | | |
|---|---|---|---|
| CN | 207890352 | * | 1/2018 |
| CN | 207123865 | * | 3/2018 |

* cited by examiner

*Primary Examiner* — Fan Zhang
(74) *Attorney, Agent, or Firm* — The Webostad Firm, a P.C.

(57) ABSTRACT

Systems and methods relating generally to on-demand printing are disclosed. In such a system, a client device has an ordering application. A mothership has a container vending machine, a container loader, a printer, an unmanned aerial vehicle ("drone"), and a communications server. The communications server is in communication with a network and configured to receive a print order from the ordering application via the network. The communications server is in communication with the printer to provide a print job to the printer responsive to the print order. The printer is configured to generate and provide a printed result for the print job into a container. The drone is configured to obtain and hold the container for airborne delivery of the printed result to an address associated with the print order.

15 Claims, 10 Drawing Sheets

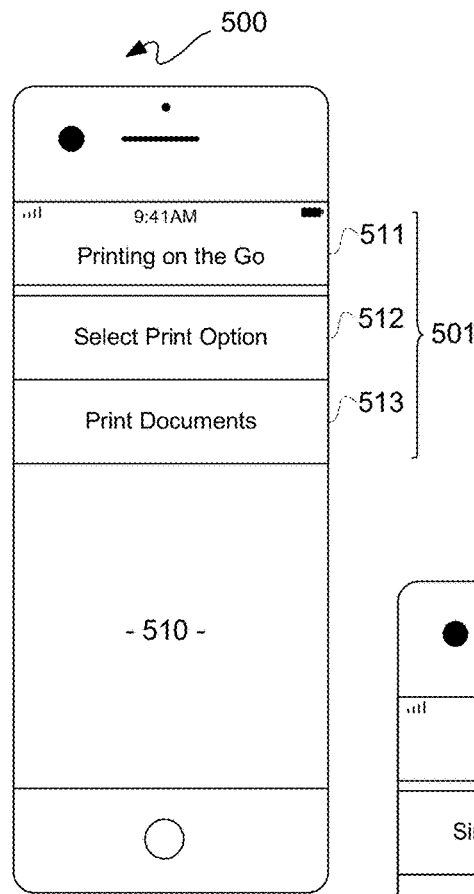
FIG. 5-1
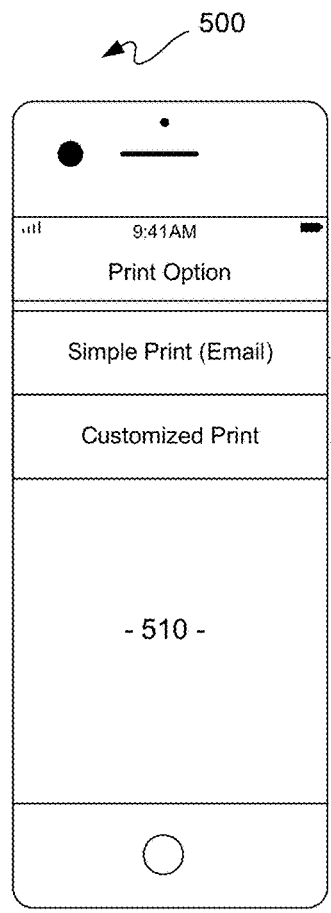
FIG. 5-2
FIG. 5-3

DRONE DELIVERY OF ON-DEMAND PRINTED MATTER

TECHNICAL FIELD

The following description relates to drone delivery of on-demand printed matter.

BACKGROUND

Presently, there are various stores having printers and/or multifunction printers for printing, scanning, and other tasks. However, the cost basis of these stores may be high due at least in part to rent, among other costs. Furthermore, people may be inconvenienced by having to travel to such stores to for print jobs and/or collect printed results.

SUMMARY

A system relates generally to on-demand printing. In such a system, a client device has an ordering application. A mothership has a container vending machine, a container loader, a printer, an unmanned aerial vehicle ("drone"), and a communications server. The communications server is in communication with a network and configured to receive a print order from the ordering application via the network. The communications server is in communication with the printer to provide a print job to the printer responsive to the print order. The printer is configured to generate and provide a printed result for the print job into a container. The drone is configured to obtain and hold the container for airborne delivery of the printed result to an address associated with the print order.

Another system relates generally to on-demand printing. In such a system, a client device has an ordering application. A mothership has an unmanned aerial vehicle ("drone"), a printer, and a communications server. The drone and the printer are coupled to one another. The communications server is in communication with a network and configured to receive a print order from the ordering application via the network. The communications server is in wireless communication with the printer to provide a print job to the printer responsive to the print order. The drone is configured for airborne delivery of the printer to an address associated with the print order.

A method relates generally to on-demand printing. In such a method, a mothership having a printer, an unmanned aerial vehicle ("drone"), a container loader, and a communications server is provided. Communication over a network by a client device having an ordering application is performed to obtain a print order. The print order is sent from the network to the communications server. Print data for the print order is generated to provide a print job. The printer prints the print job to provide a printed result. The printed result is loaded into a container with the container loader. Delivery instructions are created responsive to the print order. The delivery instructions are sent to the drone. The container is loaded into the drone. The drone airborne delivers the container with the printed result in accordance with the delivery instructions.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a schematic-block diagram depicting another example delivery system.

FIG. 2 is a perspective view depicting an example of a delivery tube.

FIG. 3-1 is a schematic-block diagram depicting an example hub-spoke-like network.

FIG. 3-2 is a flow diagram depicting an example dispatch flow.

FIGS. 5-1 through 5-3 are respective pictorial diagrams depicting exemplary screen images, respectively, of a display screen of a mobile device.

DETAILED DESCRIPTION

Figure 1:
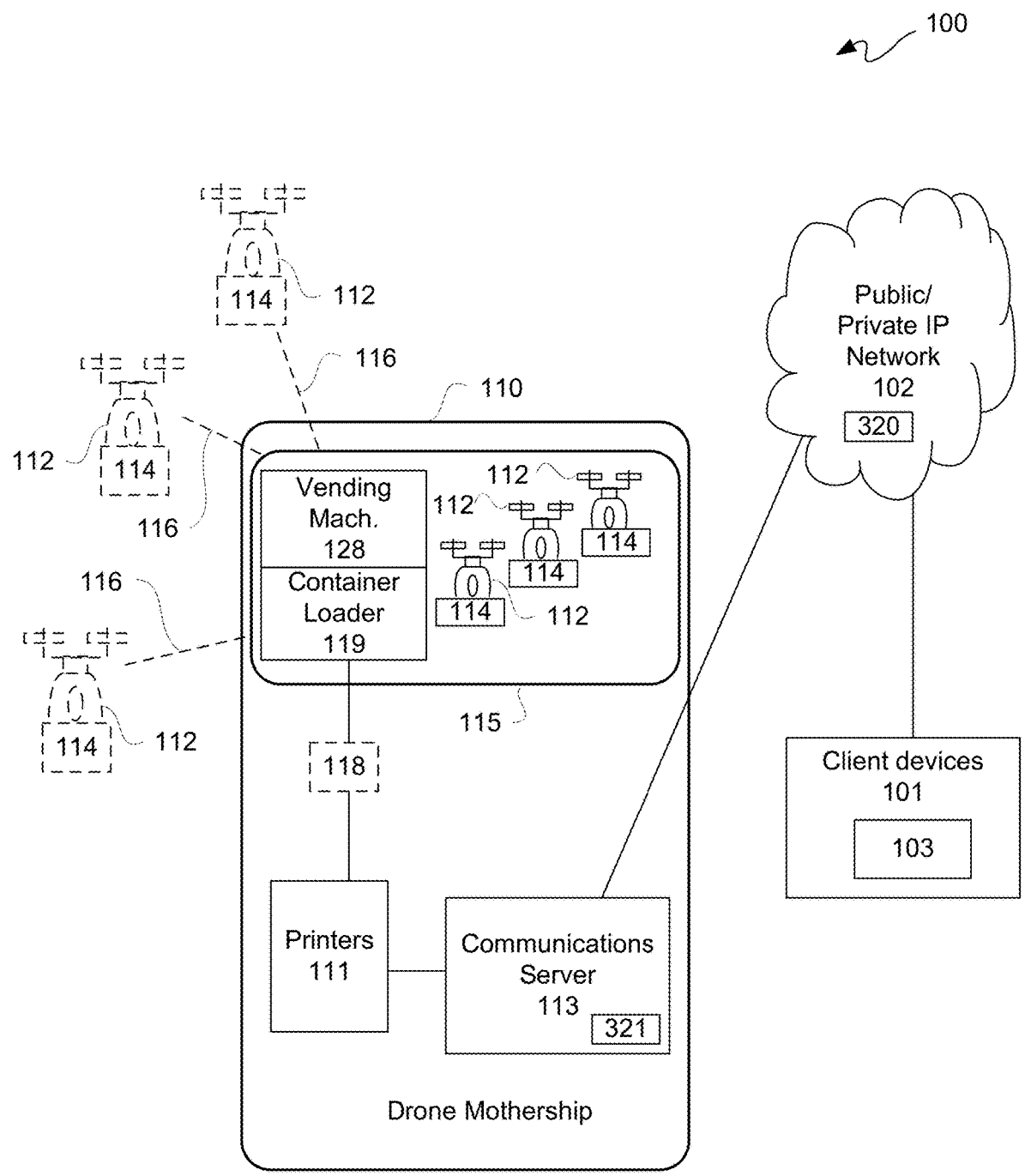
FIG. 1-1 is a schematic-block diagram depicting an example delivery system.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Before describing the examples illustratively depicted in the several figures, a general introduction is provided to further understanding.

On-demand printing is becoming more popular. However, having to go to a store to pick up a printout is becoming less compelling with online ordering for various products. As described below in additional detail, on-demand printing, including 2D and/or 3-D printing, with drone delivery for online ordering is described. A user may order up a print job and have such print job delivered by drone.

With the above general understanding borne in mind, various configurations for systems and methods for on-demand printing with online ordering for drone delivery are generally described below.

FIG. 1-1 is a schematic-block diagram depicting an example delivery system 100. Delivery system 100 includes one or more client devices 101 in communication with a network 102. Network 102 may include a private and/or public Internet Protocol network for a cloud-based network 102. Cloud-based network 102 may include applications, which are generally described as a cloud application ("app") 320. Cloud app 320 is described below in additional detail.

Each client device 101 may include an ordering application ("app") 103. For purposes of clarity by way of non-limiting example, it shall be assumed that a client device 101 is a mobile device 101, such as a mobile phone, having an ordering app 103.

Delivery system 100 further includes a base station 110 having at least one multifunction printer (MFP) and/or printer ("printer") 111, at least one an unmanned aerial vehicle (UAV; "drone") 112, and a communications server 113. Communications server 113 may be in communication with network 102 and may be configured to receive a print order from ordering app 103 via network 102. Communication server 113 may have a server app 321, which is described below in additional detail.

Print shop ("drone mothership") 110 may be a mobile platform. Examples of drone mothership 110 may include a blimp or other airship or dirigible balloon. However, in another example, drone mothership 110 may be an automotive vehicle, such as a van or other cargo vehicle. A drone mothership 110 further includes an aerodrome-like bay 115 for one or more drones 112.

Communications server 113 may be coupled for communication with printer 111 to provide a print job to printer 111 responsive to a print order. Printer 111 may be configured to generate and provide a printed result for such a print job into a container 114. Each drone 112 may be configured to obtain and hold container 114 for airborne delivery 116 of respective printed results to addresses associated with print orders. Drones 112 may be dispatched from bay 115, as generally indicated by dashed line drones 112 with containers 114.

Drones 112 may be configured to drop a container 114 or to land and release a container 114.

Drone mothership 110 may contain supplies, such as various kinds and sizes of paper, ink/toner cartridges, and/or other supplies and/or media. Drone mothership 110 may include printers 111 and containers 114. Drone mothership 110 receives orders from users, such as via mobile phone, computer, or other device, and then processes print job from such orders. Such orders may be received by text, email or online web application, or other form of communication. For example for a text order, a standing order may be present as indicated by a text message for printing up a number of copies of such standing order. For smaller print jobs, smaller drones 112 may travel to deliver print jobs to customers. Drone mothership 110 may be resupplied by hand or by drones.

Drone mothership 110 may be relocated to different areas or different base locations responsive to on demand print orders. Along those lines, a hub-and-spoke infrastructure for multiple motherships 110 in different locations may be used, as described below in additional detail. Drones may be in wireless communication with communications server 113 to indicate a current location of drone mothership 110. Furthermore, for a network of drone motherships 110, drones 112 may be re-assigned from one drone mothership 110 to another drone mothership 110 to address demand.

There are various examples for uses of drone delivery of print jobs. An example is for a paperless office, where there is no in-house printer but documents need to be printed from time-to-time. By sending an email with an attachment as an on-demand print job order, a locally based drone mothership 110 can print out and deliver a print result by drone 112 in a time efficient and cost effective manner. Another example may be when a home printer is not working and a print job needs to be performed immediately, then a print job order may be sent by email with an attachment for a print job to be delivered from a drone mothership 110 by drone 112. Another example may be for a business traveler who visits customers around the country handing out marketing materials. Instead of carrying marketing materials, a print job request to the closest drone mothership 110 may be made to printout and send such marketing materials on demand. Moreover, such printout can be customized based on customer information, such as name, logo, color, etc., and/or may be localized to a particular region, such as types of words used. For example, the words "color" and "colour" may be interchanged for purposes of localization. Of course, another example is anyone who does not own a printer and has infrequent print jobs to be performed.

An ordering app 103 may be configured for personalization of print job responsive to print order, such as for a locale, a customer, or other form of personalization. This personalization may be on-demand personalization via ordering app 103. In one example, a user may submit with an email or other communication an attachment document or design for printing with specific instructions on personalization of such attachment. In another example, a print job or standing order may be on file for a user, and such a user may just provide localization or other customization information via text, email or other communication.

After a print job order is received by communications server 113, communications server 113 may be configured to generate a confirmation responsive to print order and to send confirmation via network 102 to ordering app 103 on client device 101. Such a confirmation may include a preview result for print job viewable on client device 101, such as a mobile device, via ordering app 103. Furthermore, such a confirmation may include an encrypted code, where such code is decrypted by ordering app 103 for viewing on client device 101, such as viewing on a mobile device via ordering app 103.

Drone mothership 110 may have a container loader 119. Container loader 119 may be coupled to receive each printed result 118 from one or more printers 111, and configured to load printed results 118 into respective containers 114. Container loader 119 may be configured to provide a printed result 118 to each container 114 associated with a drone 112 for dispatch from bay 115, as generally indicated by dashed line drones 112 with containers 114. Container loader 119 may be coupled to a container vending machine 128 to receive containers 114 therefrom.

Figures 1, 2:
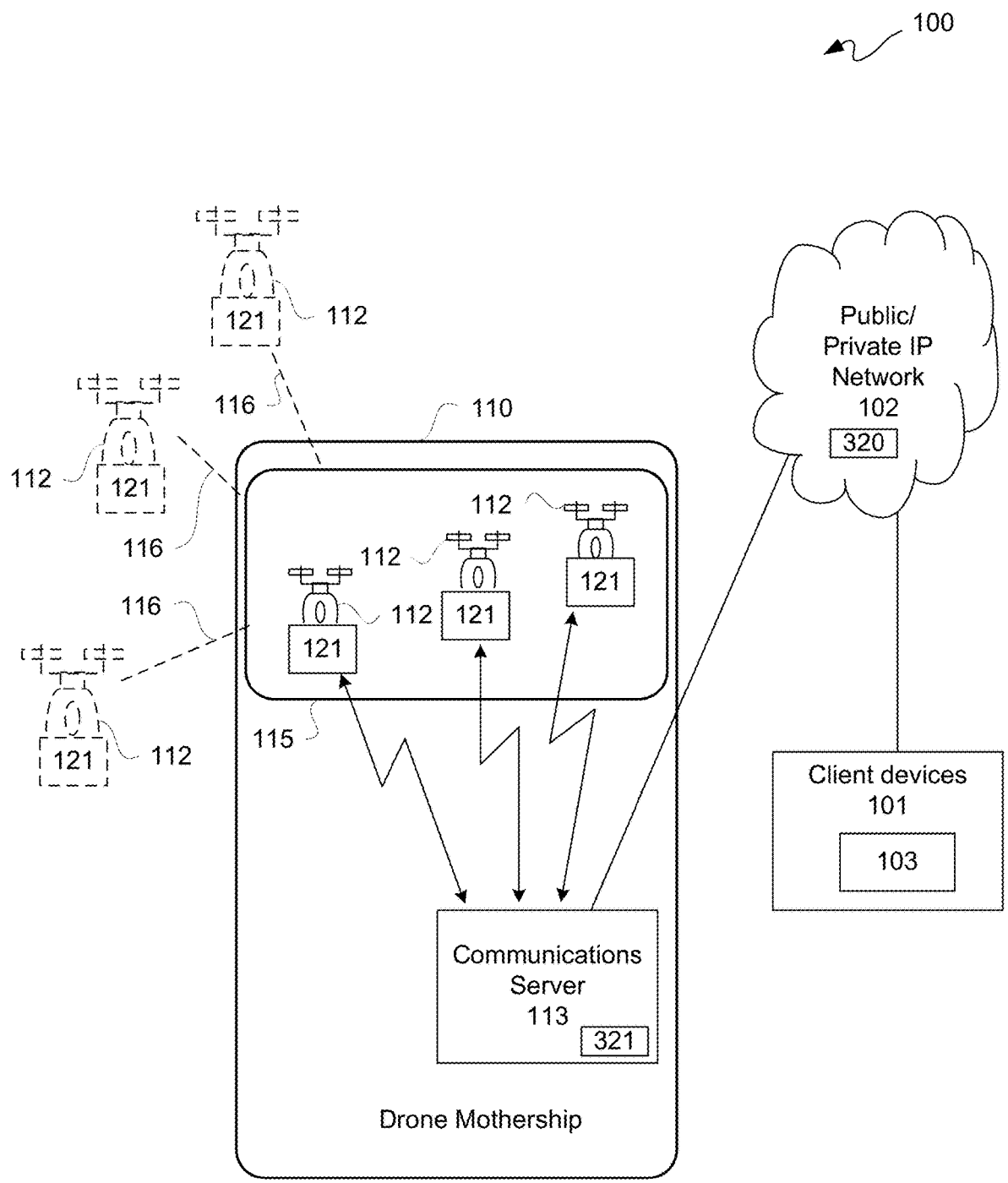
Figure 2:
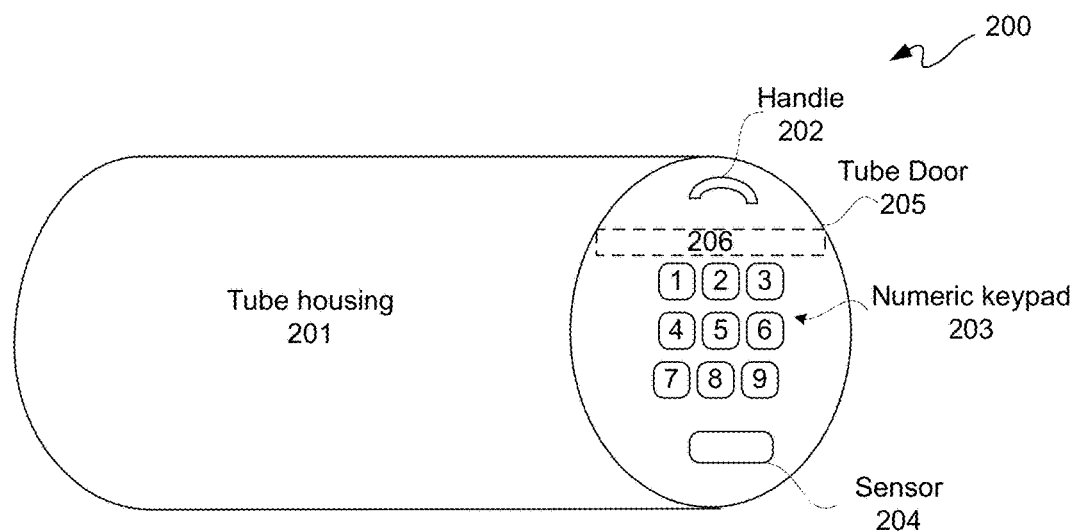

FIG. 2 is a perspective view depicting an example of a delivery tube 200. Delivery tube 200 is an example of a container 114. Delivery tube 200 is further described with simultaneous reference to FIGS. 1-1 and 2.

Delivery tube 200 may be a cylinder or other shaped tube housing 201 for defining an internal volume. A tube door 205 may be at one end of tube housing 201 for opening and closing for entry into such internal volume. Another end (not shown) of tube housing 201 may be sealed, such as integrally formed with tube housing 201 for example.

Tube door 205 may include a numeric keypad 203, a sensor 204, and a knob or handle 202. Tube door 205 may be hinged or in like manner attached for moveable use to tube housing 201, and opposite of such hinged side may be a lock side for a locking mechanism 206 to lock tube door 205 to tube housing 201. Locking mechanism 206 may be a conventional programmable electronic locking mechanism. Locking mechanism 206 may be for locking a printed result in delivery tube 200. A confirmation for print job may include a code for unlocking programmable locking mechanism 206 via ordering app 103.

However, in another example, tube door 205 may not be hinged to tube housing 201, but rather locking mechanism 206 may have multiple contact points to tube housing 201 for locking tube door 205 to tube housing 201.

Numeric key pad 203 may be used for entering a code or a personal identification number (PIN) for unlocking a locking mechanism 206 for obtaining entry to an internal volume of tube housing 201. Such a code may be provided with a confirmation of a print job, preset by a user as part of a user account, or otherwise be in possession of a user. A print result from a print job in tube housing 201 may be obtained therefrom by unlocking tube door 205.

In another example, tube door 205 may have a sensor 204, such as a near-field communication (NFC) or Bluetooth sensor for example. A client device 101 associated with an ordering app 103 used to order a print job may be used to unlock tube door 205 via sensor 204. For example, an ordering app 103 may communicate with sensor 204 via an NFC or Bluetooth sensor 204 to unlock a locking mechanism 206.

FIG. 1-2 is a schematic-block diagram depicting another example delivery system 100. Delivery system 100 includes one or more client devices 101 in communication with a network 102. Network 102 may include a private and/or public Internet Protocol network for a cloud-based network having a cloud app 320. Each client device 101 may include an ordering app 103. For purposes of clarity by way of non-limiting example, it shall be assumed that a client device 101 is a mobile device 101 having an ordering app 103.

Delivery system 100 further includes a drone mothership 110 having a communications server 113 and at least one or more drones 112 having attached or built-in lightweight printers 121. Lightweight printers 121 may be what is conventionally considered portable or mobile printers, and, in contrast, printers 111 may be office printers or commercial printers. Again, communications server 113 may have a server app 321, which is described below in additional detail. However, server app 321 may be configured differently for the different topologies as between delivery systems 100 of FIGS. 1-1 and 1-2.

In this example, printers travel to a person or other entity that is placing a print order. The person may then print a print job locally. For printed results, such person placing a print order may be asked if they have printing materials. Smaller printers and/or larger drones may be used to deliver both printing materials and printer 121.

Communications server 113 may be in communication with network 102 and may be configured to receive a print order from ordering app 103 via network 102. Drone mothership 110 may be a mobile platform. Examples of drone mothership 110 may include a blimp or other airship or dirigible balloon. However, in another example, drone mothership 110 may be an automotive vehicle, such as a van or other cargo vehicle. A drone mothership 110 further includes an aerodrome-like bay 115 for one or more drones 112 having corresponding printers 121.

Communications server 113 may be in wireless communication with drones 112 responsive to a print order. Each drone 112 may be configured to obtain and hold a printer 121 for airborne delivery 116 to addresses associated with print orders. Drones 112 may be dispatched from bay 115, as generally indicated by dashed line drones 112 with printers 121.

In another example, drones 112 may be configured to land and release a printer 121. A drone 112 may then subsequently return to retrieve such a printer 121. However, for purposes of clarity by way of example, it shall be assumed that drones 112 stay with printers 121 for use for a print job and subsequent return to bay 115.

Drone mothership 110 may contain supplies, such as various kinds and sizes of paper, ink/toner cartridges, and/or other supplies and/or media. Drone mothership 110 may include printers 121 and containers 114. Drone mothership 110 receives orders from users via client devices 101, such as via cell phone, computer, or other device, and then prints content from such orders. Such orders may be received by text, email or online web application, or other form of communication. Drone mothership 110 may be resupplied by hand or by drones.

Drone mothership 110 may be relocated to different areas or different base locations responsive to on demand print orders. Along those lines, a hub-and-spoke infrastructure for multiple motherships 110 in different locations may be used. Drones may be in wireless communication with communications server 113 to indicate a current location of drone mothership 110. Furthermore, for a network of drone motherships 110, drones 112 may be re-assigned from one drone mothership 110 to another drone mothership 110 to address demand. Along those lines, drones 112 may be re-assigned for purposes of meeting print job demands.

There are various examples for uses of drone delivery of print jobs. An example is for a paperless office, where there is no in-house printer but documents need to be printed from time-to-time locally. By sending a drone 112 with a printer 121 for an on-demand print job order, a locally based drone mothership 110 supply a printer 121 in a time efficient and cost effective manner. Another example may be when a home printer is not working and a print job needs to be performed immediately, then a print job order may be sent by email for a printer 121 to be delivered from a drone mothership 110 by drone 112. Another example may be for a business travel who visits customers around the country handing out marketing materials. Instead of carrying marketing materials, a print job request to the closest drone mothership 110 may be made to receive such a printer and locally print marketing materials on demand. Moreover, such printout can be customized based on customer information, such as name, logo, color, etc., and/or may be localized to a particular region by such a business person on demand. Of course, another example is anyone who does not own a printer and has infrequent print jobs to be performed.

An ordering app 103 may be configured for knowing location of a customer, a PIN of a customer, or other form of personalized information, such as type and configuration of printer 121. This personal information, including phone number, may be used with ordering app 103 for authentication, including sending a text with a code to unlock a printer 121 for example.

After a print job order is received by communications server 113, communications server 113 may be configured to generate a confirmation responsive to such a print order and to send confirmation via network 102 to ordering app 103 on client device 101. Such a confirmation may include a preview of a printer 121 to be sent for a print job viewable on client device 101, such as a mobile device, via ordering app 103. Furthermore, such a confirmation may include an encrypted code, where such code is decrypted by ordering app 103 for viewing on client device 101, such as viewing on a mobile device via ordering app 103. This code may be input, by numeric pad or NFC/Bluetooth sensor for example, into a printer 121 for unlocking thereof for subsequent operation.

Figures 1, 3:
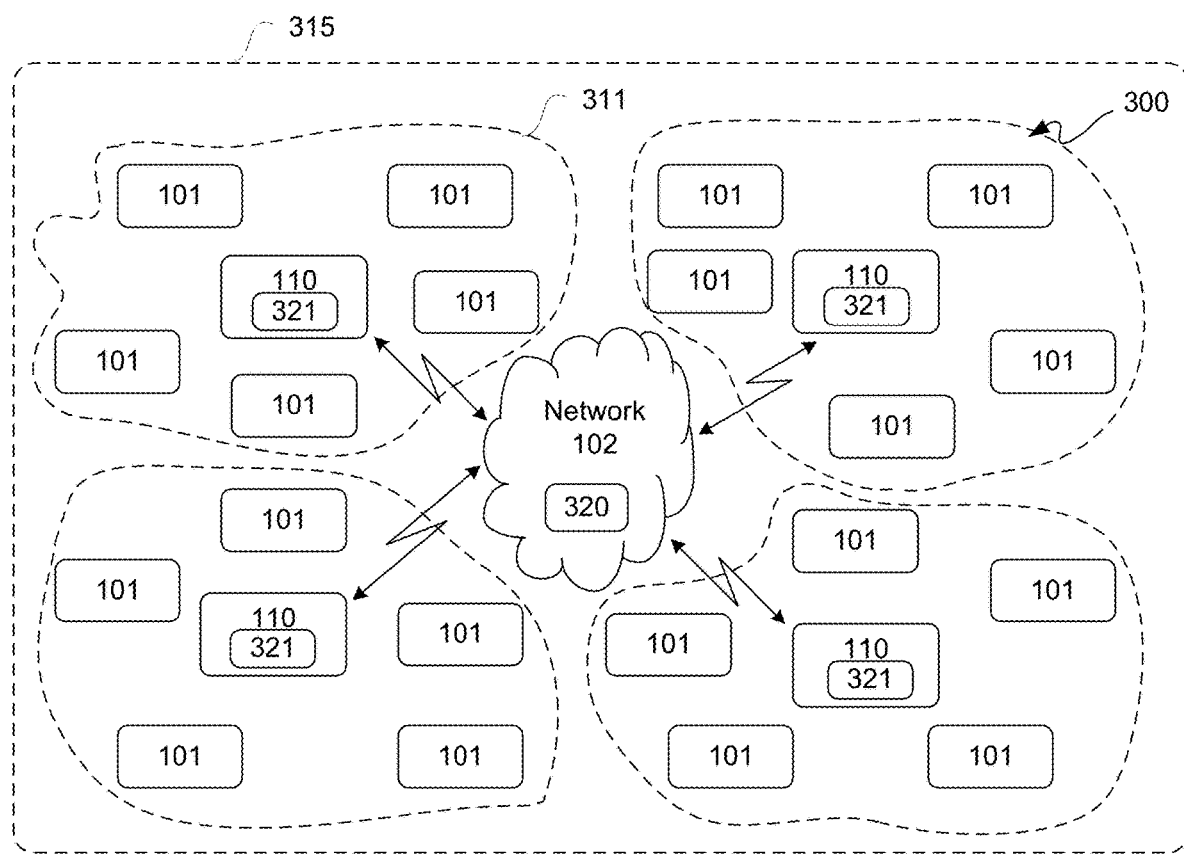
Figures 2, 3:
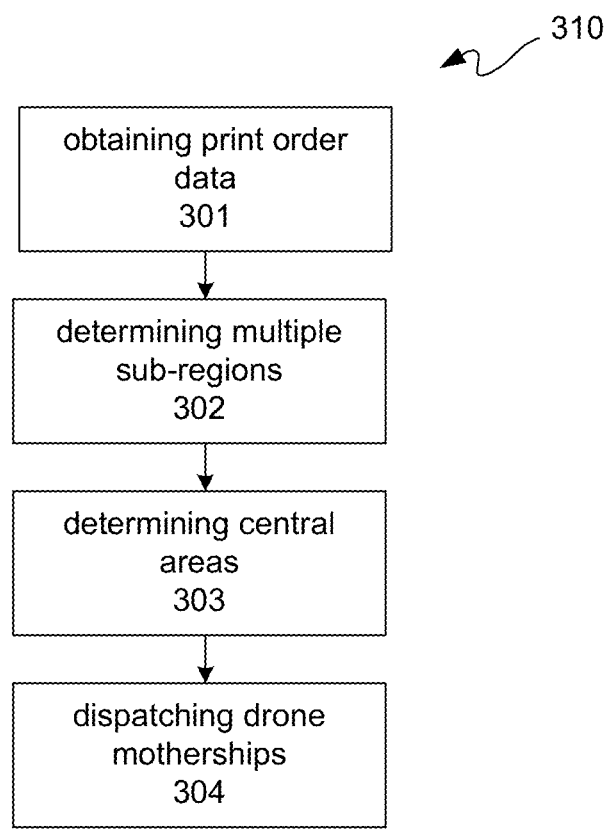

By having a cloud app 320, such cloud app 320 may have data associated with each of a plurality of server applications ("apps") 321 of communication servers 113. FIG. 3-1 is a schematic-block diagram depicting an example hub-spoke-like network 300. FIG. 3-2 is a flow diagram depicting an example dispatch flow 310. FIGS. 3-1 and 3-2 are related to one another, and accordingly are further described simultaneously with additional reference to FIG. 1-1 or 1-2. Along those lines, drone motherships 110 may be distributed within a region 315 divided up into two or more sub-regions 311 to meet possible demand and provide localized coverage for client devices 101 in each such sub-region or cell.

At 301, a cloud app 320 may obtain print order data from multiple client devices 101 within such a region 315. At 302, responsive to such print order data obtained at 301, multiple sub-regions 311 for a region 315 may be determined.

Client devices 101 may communicate with a cloud app 320 on network 102, as previously described. Cloud app 320 may be a data hub of network 300. Cloud app 320 may obtain print order data from client devices 101 in a region 315. Cloud app 320 may task drone motherships 110 to different locations, namely sub-regions 311, to meet demand in such multiple sub-regions, as a form of load balancing.

At 303, general central areas within each sub-region 311 may be determined by cloud app 320. Cloud app 320 may be in communication with a server app 321 of each drone mothership 110. Such central areas may be based on print order data within a sub-region by cloud app 320. At 304, drone motherships 110 may be dispatched by cloud app 320 to central regions within such multiple sub-regions 311 responsive at least in part to print order data obtained at 301. Other factors may include terrain and proximity to commercial areas, among other factors. Additionally, cloud app 320 may task drones 112 of motherships 110 to cover out-of-region demand for purposes of load balancing. Drones 112 may be flown out of drone motherships 110 from central regions for delivery of containers to delivery locations.

Figure 4:
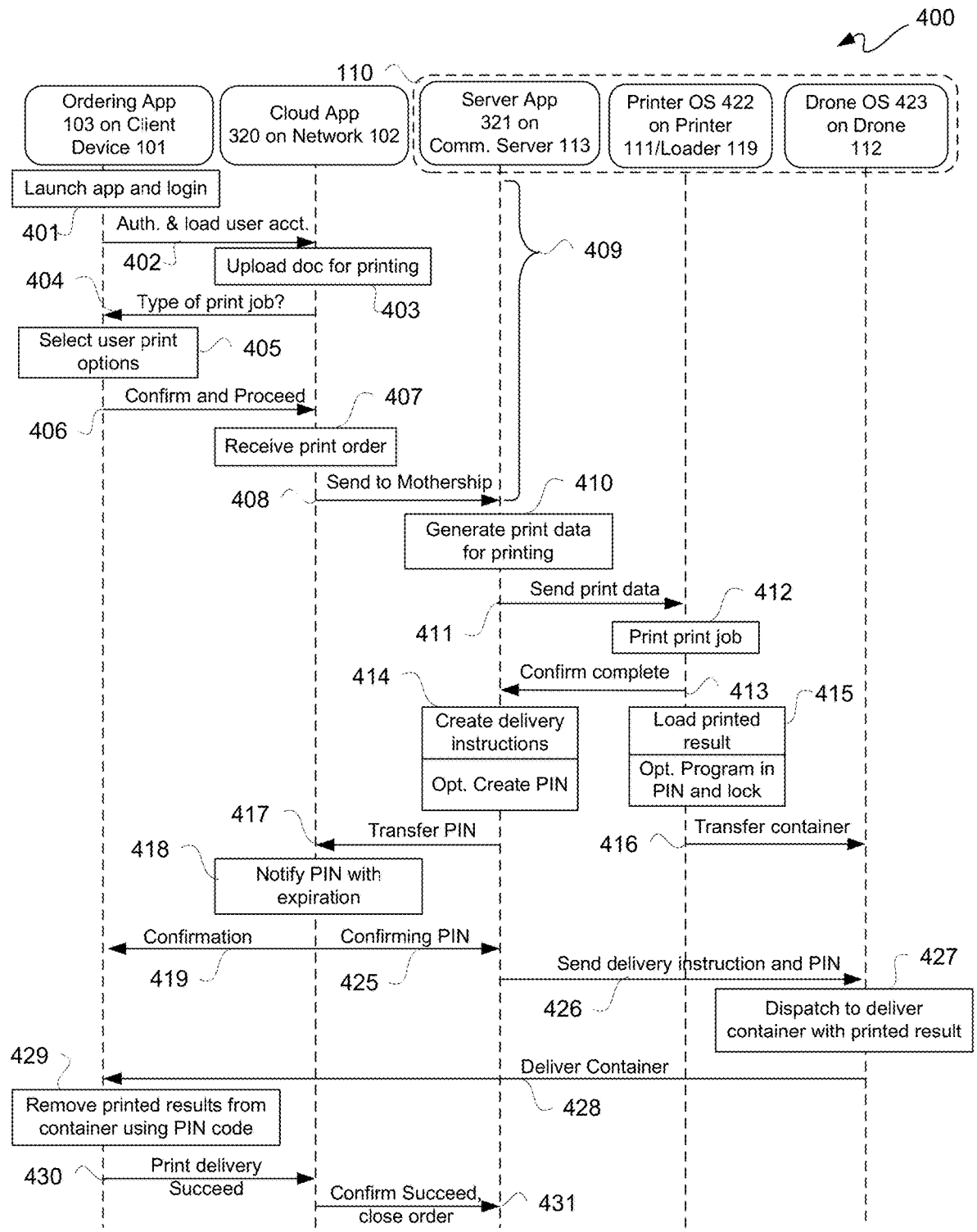
FIG. 4 is a flow diagram depicting an example of a print services process.

FIG. 4 is a flow diagram depicting an example of a print services process 400. Print services process 400 is for on-demand printing by online ordering with delivery of a printed result by drone. Print services process 400 is further described with simultaneous reference to FIGS. 1-1 through 4.

At 401, a user of a client device 101 may launch an ordering app 103 and login to such app. At 402, a user account may be authenticated and loaded.

At 403, a print job may be uploaded from client device 101 or other designated location of such document to network 102. A cloud-based app 320 on such network 102 may be used to transfer such print job.

At 404, cloud app 320 may communicate with ordering app 103 to identify a type of printing job to be performed. For example, two general categories of printing jobs may be custom and simple. At 405, a user may input selected print options to ordering app 103. At 406, such selected options at 405 may be provided to cloud app 320 over network 102, and a confirmation of such print job with such selected options may be provided from cloud app 320 to ordering app 103.

At 407, a cloud app 320 may receive a print job for a client. Such a print job may be for example a simple print, such as an email with a document attachment, or a customized print-generated document for a customer of a client.

At 408, a print job received at 407 may be sent as a print order or request to a communication server app 321 running on communication server 113 of a drone mothership 110. Along those lines, a print job may be interrogated to determine a delivery location for a print result of such print job, and a nearest drone mothership 110 to such delivery location may be sent such a print job received at 407.

Generally, operations 401 through 408 is an example of a set of operations 409 for communicating over a network 102 between one or more client devices 101 having ordering apps 103 and a communications server 113 to obtain print orders having associated documents and/or information for customized print jobs, and delivery instructions associated therewith.

After receiving one or more print orders from one or more ordering apps 103 by a communications server 113, server app 321 may generate print data for each of such print orders at 410 to provide corresponding print jobs. Print data for each print order may be data to be used by a printer operating system (OS) 422 of printer 111 for printing in compliance with such print orders. Each print job may include print data, as well as any documentation to be printed.

At 411, each print job may be sent to a printer 111 for printer OS 422. At 412, one or more printers 111 may be used to print one or more print jobs to provide one or more printed results. For example, a document may be printed, and such printed document may further have included therewith a cover page including user information, delivery address, type of print job, and/or other information regarding such print job.

At 413, a confirmation that a print job was completed may be sent from printer OS 422 of printer 111 to server app 321 of communication server 113. At 414, server app 321 of communication server 113 may create delivery instructions for a completed print job. Such delivery instructions may be for a drone 112 in a supply chain. Delivery instructions may optionally include creation of a PIN for a container 114.

At 415, one or more printed results may be transferred or loaded from printer 111 into one or more containers 114 by a container loader 119. Optionally, at 415, an electronic locking mechanism 206 may be programmed by container loader 119 in communication with server app 321 with such PIN optionally created at 414, and such container 114 may be locked with electronic locking mechanism 206 by container loader 119. At 416, a container with a printed result may be transferred from container loader 119 to a drone 112.

For purposes of clarity by way of example and not limitation, it is assumed that an optional PIN is created at 414. Accordingly, different PINs may be created for different print orders. Along those lines, at 417 a PIN created at 414 may be transferred from server app 321 on communications server 113 to cloud app 320 on network 102. At 418, cloud app 320 may notify or augment such PIN with an expiration date or expiration date and time.

At 419, a confirmation may be sent from server app 321 on communications server 113 to ordering app 103 on client device 101. Along those lines, a confirmation code may be generated and provide with such confirmation. Such confirmation code may be sent to a user or client after printing is completed, and such code may be encrypted in transit. Such code may be decrypted by ordering app 103 in order to be viewable on a display screen of client device 101.

At 425, a PIN with an expiration date or time may be confirmed from cloud app 320 on network 102 to server app 321 on communications server 113. In response to a confirmation of PIN received by server app 321, at 426 server app 321 may communicate delivery instructions and such PIN to a drone 112 directly or indirectly through container loader 119. At 427, a drone 112 informed with an address or coordinates from delivery instructions may be dispatched to deliver a container 114 with a printed result for an associated print job to such address or coordinates.

At 428, airborne delivery of one or more containers 114 with printed results by one or more drones 112 in accordance with associated delivery instructions may be performed. At 429, a client may remove printed results from a container 114 using a PIN to unlock electronic locking mechanism 206.

At 430, a client may use ordering app 103 on client device 101 to indicate that a print delivery succeeded to cloud app 320. At 431, cloud app 320 may indicate to server app 321 confirmation of a successful delivery, and server app 321 in response to such confirmation may close a print order for such delivery.

FIGS. 5-1 through 5-3 are respective pictorial diagrams depicting exemplary screen images 501 through 503, respectively, of a display screen 510 of a mobile device 500. Mobile device 500 is an example of a client device 101, and screen images 501 through 503 are examples of screen images for a user interface (UI) for an ordering app 103.

Screen image 501 displayed on display screen 510 may include a name 511 of ordering app 103, as well as a select print option item 512 and a print documents item 513. By item, it is generally meant a menu item, a selectable text and/or icon, or the like. A user logging into ordering app 103 may have screen 501 displayed in order to select print jobs for printing. A similar UI may be used for desktop and notebook computers.

For selection of select print option item, screen image 502 may be displayed in place of screen image 501 on display screen 510. Screen image 502 displayed on display screen 510 may include a name 521 of such screen image of ordering app 103, as well as a simple print (email) item 522 and a customized print item 523.

For selection of documents to send, screen image 503 may be displayed on display screen 510. Screen image 503 displayed on display screen 510 may include items 531, namely a back or home item, a document item, and a send item. Display of text or image 532 may be a selected document to be sent.

Figure 6:
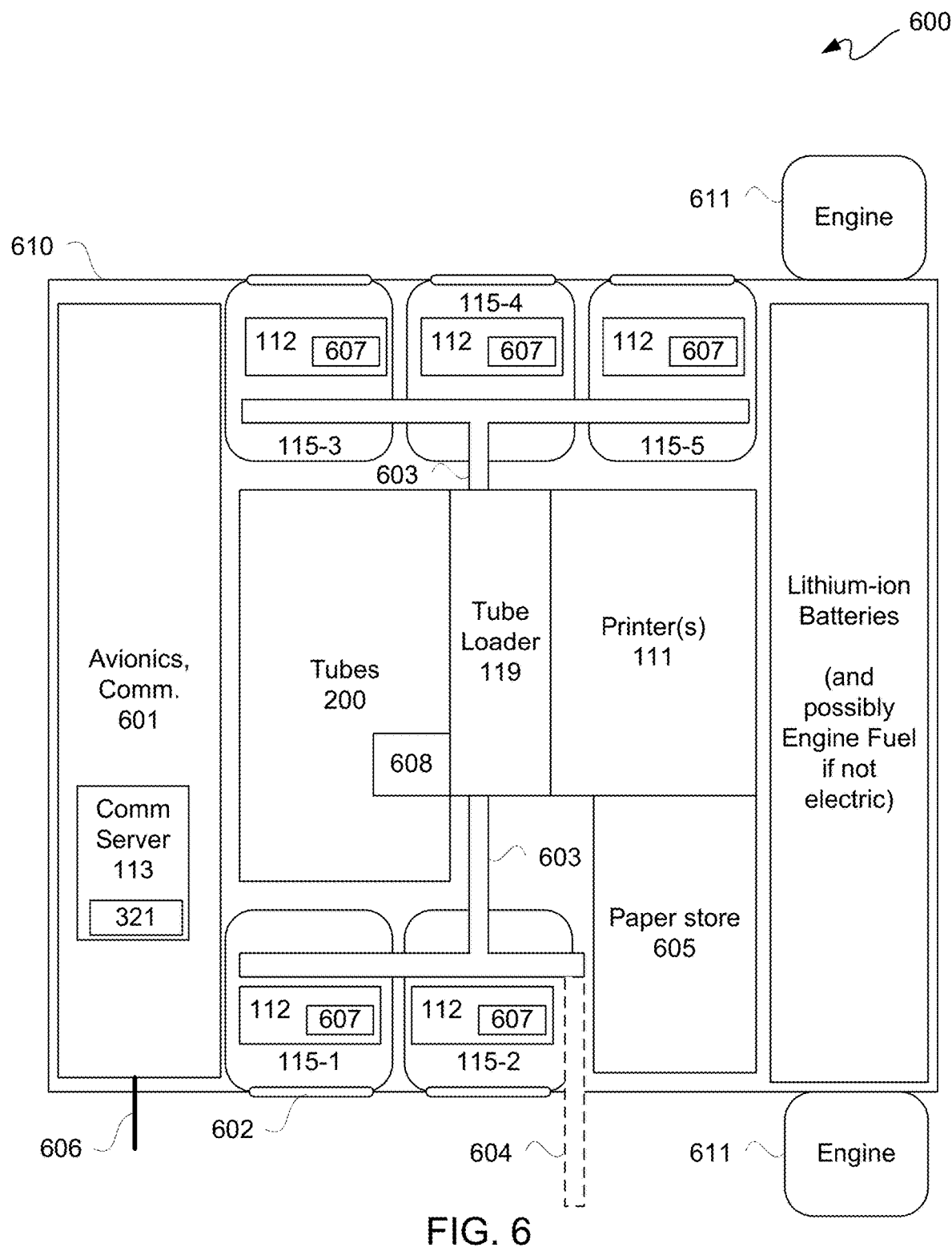
FIG. 6 is a block diagram of a top-down view depicting an exemplary drone mothership gondola.

FIG. 6 is a block diagram of a top-down view depicting an exemplary drone mothership gondola 600. Drone mothership gondola 600 may be of a drone mothership 110 of FIG. 1-1. In this example, drone mothership gondola 600 includes a housing or airframe 610 attached to a blimp or other airship (not shown). By use of an airship, long times suspended in flight may be provided. In other words, an airship provides a platform which may be suspended over a designated area for an extended period of time, and so drones may return to such airship, and may be recharged in such airship, without having to leave such a designated area for an extended period of time.

There may be an engine 611 on either side of airframe 610; however, as many constituent parts of a blimp gondola are well-known, such parts are not described herein in unnecessary detail. Drone mothership gondola 600 may include avionics and communications electronic devices 601. Such electronics may include ship to drone and drone to ship communications, including without limitation a communications server 113 configured for wireless communication with network 102.

In this example, there are five drone bays 115-1 through 115-5; however, fewer or more than five drone bays may be used in other examples. Drone bay doors 602 may be controllably opened and closed for each of such drone bays.

Drone bays 115 may be coupled to tube loader 119 to receive delivery tubes 200. One or more networks of feed tubes 603 may be used for transferring delivery tubes 200 from tube loader 119 to drone bays 115.

Generally, drones 112 move in and out of bays 115 while drone mothership gondola 600 is airborne. However, if an airship is moored some tens of feet above the ground, mooring may allow users to pick up printed results directly from a drone mothership through a network of feed tubes or a conveyors 603 to an extendable tube 604 which extends the tens of feet toward the ground and provides users an ability to pick up printed results in locked containers 114, which containers 114 can be returned by extendable tube 604 after getting print jobs therefrom.

Drone mothership gondola 600 may have a radio antenna 606 to broadcast a beacon so drones 112 can acquire such beacon and return to drone mothership gondola 600. Drones 112 include signal detection equipment 607 to find drone mothership gondola 600. Along those lines, a drone mothership and drones 112 may include GPS navigation equipment.

Drone mothership gondola 600 may have a paper store or storage 605 for feeding paper into one or more printers 111. While sheets of paper may be used, rolls of paper may be used for placing printed results more readily in delivery tubes 200. Storage 605 may store other print media. Delivery tubes 200 may be stored in a vertical drop vending system, similar to those used by vending machines. A robotic arm 608 may grab a delivery tube 200 and move such tube to tube loader 119.

Assuming paper is rolled by a roller or off of a roll or rolled around a cardboard core, a robotic arm 608 may place a delivery tube 200 over such rolled paper, and such robotic arm 608 may close a tube door 205. Such delivery tube 200 may then be placed on a conveyor 603 to be conveyed to a predetermined drone bay 115. In another example, a tube loader 119 may be replaced with a human to roll printed results and place in and close up delivery tubes 200, and then manually affix such delivery tubes to drones 112.

Figure 7:
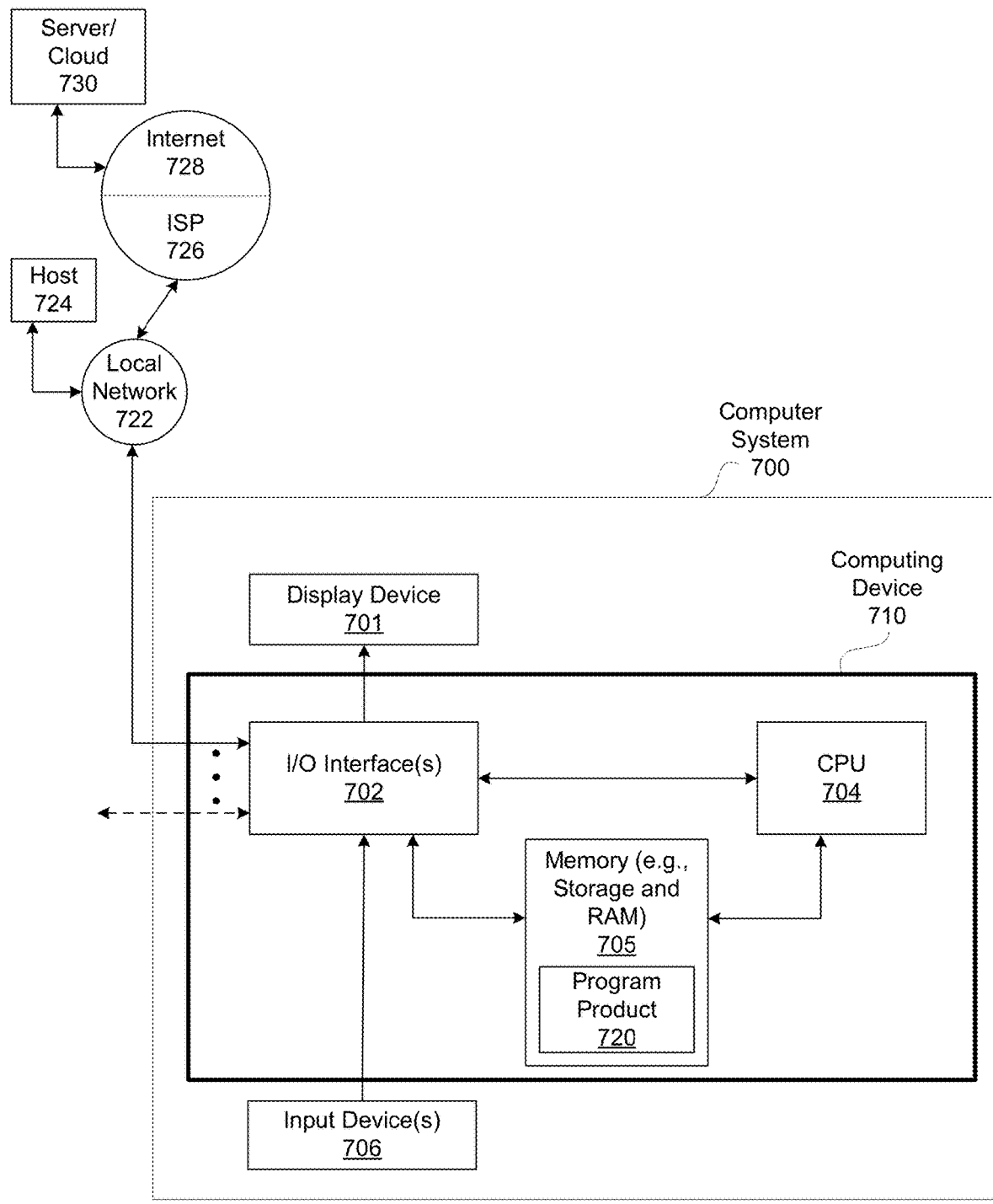
FIG. 7 is a block diagram depicting an example computer system.

Because one or more examples include use of a computer system, such as for a communications server or a cloud-based computing system, FIG. 7 is a block diagram depicting an example computer system 700 upon which one or more aspects described herein may be implemented. Along those lines, an MFP, such as MFP 702, in effect may be a computer system, where a panel thereof, is effectively a display device 701.

More generally, such a computer system 700 may include a programmed computing device 710 coupled to a display device 701, such as Liquid Crystal Displays ("LCDs"), Light Emitting Diode ("LED") displays, and to one or more input devices 706, such as a keyboard and a cursor pointing device. Display 701 may be a touch screen display, as previously described. Computer system 700 by itself or networked with one or more other computer systems may provide an information handling system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, Unix, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an SATA bus or other bus. Moreover, one or more SSDs may be used, such as for RAID or other multiple drive storage for example.

I/O interface 702 may include chip set chips, graphics processors, and/or daughter cards, among other known circuits. I/O interface 702 may be include interface circuitry adapted to receive and transmit data, such as data files and the like.

Programmed computing device 710 may optionally include one or more peripheral cards (not shown). An example of a daughter or peripheral card may include a network interface card ("NIC"), a display interface card, and a Universal Serial Bus ("USB") interface card, among other known circuits.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing all or portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or other Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are example forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. Received code may be executed by processor 704 as it is received, and/or stored in a storage device, or other non-volatile storage, of memory 705 for later execution. In this manner, computer system 700 may obtain application code in the form of a carrier wave.

Figure 8:
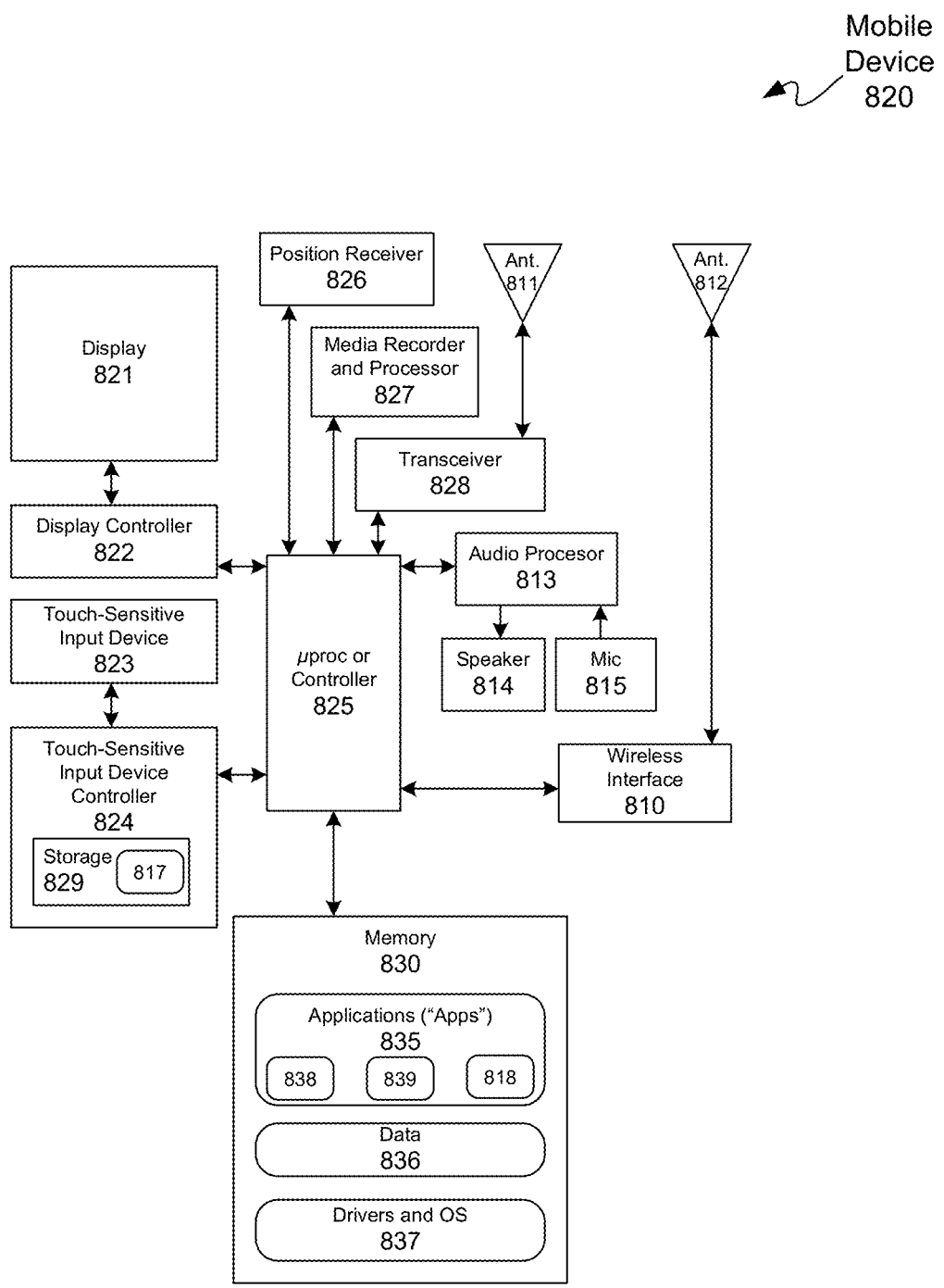
FIG. 8 is block diagram depicting an exemplary portable communication device.

Because one or more examples involve a mobile device for a client device 101, FIG. 8 is block diagram depicting an exemplary portable communication device ("mobile device") 820. Mobile device 820 may include a wireless interface 810, an antenna 811, an antenna 812, an audio processor 813, a speaker 814, and a microphone ("mic") 815, a display 821, a display controller 822, a touch-sensitive input device 823, a touch-sensitive input device controller 824, a microprocessor or microcontroller 825, a position receiver 826, a media recorder 827, a cell transceiver 828, and a memory or memories ("memory") 830.

Microprocessor or microcontroller 825 may be programmed to control overall operation of mobile device 820. Microprocessor or microcontroller 825 may include a commercially available or custom microprocessor or microcontroller.

Memory 830 may be interconnected for communication with microprocessor or microcontroller 825 for storing programs and data used by mobile device 820. Memory 830 generally represents an overall hierarchy of memory devices containing software and data used to implement functions of mobile device 820.

Memory 830 may include, for example, RAM or other volatile solid-state memory, flash or other non-volatile solid-state memory, a magnetic storage medium such as a hard disk drive, a removable storage media, or other suitable storage means. In addition to handling voice communications, mobile device 820 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 830 stores drivers, such as I/O device drivers, and operating system programs ("OS") 837. Memory 830 stores application programs ("apps") 835 and data 836. Data may include application program data.

I/O device drivers may include software routines accessed through microprocessor or microcontroller 825 or by an OS stored in memory 830. Apps, to communicate with devices such as the touch-sensitive input device 823 and keys and other user interface objects adaptively displayed on a display 821, may use one or more of such drivers. For example, a driver may be used for communication from keys of a user interface displayed on display 821 associated with touch zones of touch sensitive input device 823. Moreover, drivers may be used for other actual or virtual input/output ports of mobile device 820.

Mobile device 820, such as a mobile or cell phone, includes a display 821. Display 821 may be operatively coupled to and controlled by a display controller 822, which may be a suitable microcontroller or microprocessor programmed with a driver for operating display 821.

Touch-sensitive input device 823 may be operatively coupled to and controlled by a touch-sensitive input device controller 824, which may be a suitable microcontroller or microprocessor. For example, touch-sensitive input device may be a haptic input device, a pressure-sensitive input device, or some other touch-sensitive input device.

Along those lines, touching activity input via touch-sensitive input device 823 may be communicated to touch-sensitive input device controller 824. Touch-sensitive input device controller 824 may optionally include local storage 829 for storing locations or touch zones or other sensed information 817 associated with touching activity input. In another example, sensed information 817 may be stored in memory 830.

Touch-sensitive input device controller 824 may be programmed with a driver or application program interface ("API") for output of sensed information 817 to an app 818 of apps 835. In another example, app 818 may be incorporated into OS 837.

Microprocessor or microcontroller 825 may be programmed to interface directly via touch-sensitive input device 823 or through touch-sensitive input device controller 824. Microprocessor or microcontroller 825 may be programmed or otherwise configured to interface with one or more other interface device(s) of mobile device 820. Microprocessor or microcontroller 825 may be interconnected for interfacing with a transmitter/receiver ("transceiver") 828, audio processing circuitry, such as an audio processor 813, and a position receiver 826, such as a global positioning system ("GPS") receiver. An antenna 811 may be coupled to transceiver 828 for bi-directional communication, such as cellular and/or satellite communication.

Mobile device 820 may include a media recorder and processor 827, such as a still camera, a video camera, an audio recorder, or the like, to capture digital pictures, audio and/or video. Microprocessor or microcontroller 825 may be interconnected for interfacing with media recorder and processor 827. Image, audio and/or video files corresponding to the pictures, songs and/or video may be stored in memory 830 as data 836.

Mobile device 820 may include an audio processor 813 for processing audio signals, such as for example audio information transmitted by and received from transceiver 828. Microprocessor or microcontroller 825 may be interconnected for interfacing with audio processor 813. Coupled to audio processor 813 may be one or more speakers 814 and one or more microphones ("mic") 815, for projecting and receiving sound, including without limitation recording sound, via mobile device 820. Audio data may be passed to audio processor 813 for playback. Audio data may include, for example, audio data from an audio file stored in memory 830 as data 836 and retrieved by microprocessor or microcontroller 825. Audio processor 813 may include buffers, decoders, amplifiers and the like.

Mobile device 820 may include one or more local wireless interfaces 810, such as a WiFi interface, an infrared transceiver, and/or an RF adapter. Wireless interface 810 may provide a Bluetooth adapter, a WLAN adapter, an Ultra-Wideband ("UWB") adapter, and/or the like. Wireless interface 810 may be interconnected to an antenna 812 for communication. As is known, a wireless interface 810 may be used with an accessory, such as for example a hands-free adapter and/or a headset. For example, audible output sound corresponding to audio data may be transferred from mobile device 820 to an adapter, another mobile radio terminal, a computer, or another electronic device. In another example, wireless interface 810 may be for communication within a cellular network or another Wireless Wide-Area Network ("WWAN").

Figure 9:
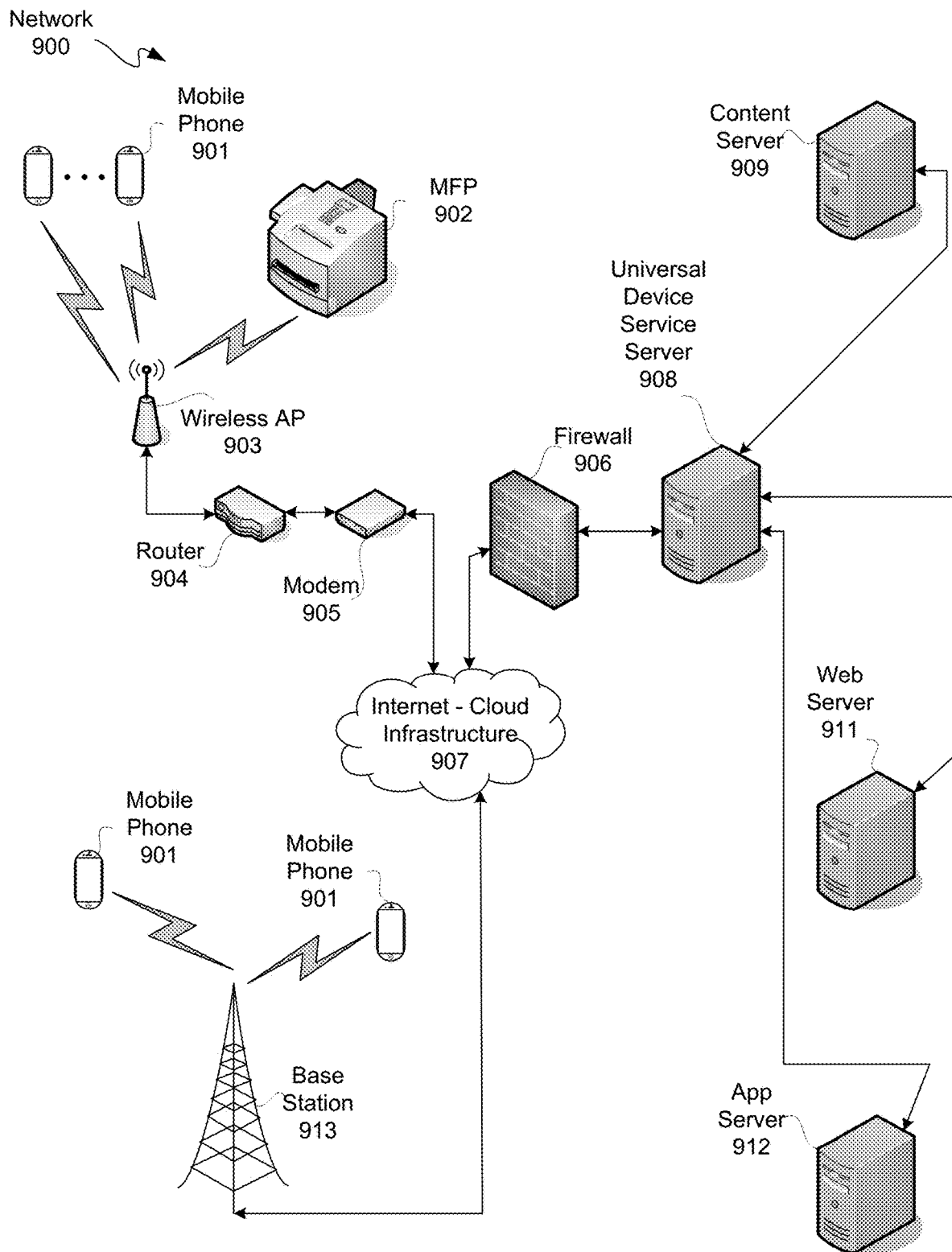
FIG. 9 is a pictorial diagram depicting an exemplary network.

Because one or more examples involve a network or networks, FIG. 9 is a pictorial diagram depicting an exemplary network 900. Network 900 may include one or more mobile phones 901 in wireless communication with wireless access point ("AP") 903 and one or more mobile phones 901 in communication with a base station 913.

A MFP 902 may be in wireless communication with wireless AP 903. Wireless AP may be connected for communication with a router 904, which in turn may be connected to a modem 905. Modem 905 and base station 913 may be in communication with the Internet-Cloud infrastructure 907.

A firewall 906 may be in communication with the Internet-Cloud infrastructure 907. Firewall 906 may be in communication with a universal device service server 908. Universal device service server 908 may be in communication with a content server 909, a web server 911, and/or an app server 912. App server 912, as well as a network 900, may be used for downloading an app as described herein.

Accordingly, known details regarding networks are not described in unnecessary detail for purposes of clarity and not limitation.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A system, comprising:
a client device having an ordering application;
an airborne mothership having a container vending machine, a container loader, a printer, an unmanned aerial vehicle ("drone"), and a communications server;
the communications server in communication with a network and configured to receive a print order from the ordering application via the network;
the communications server in communication with the printer to provide a print job to the printer responsive to the print order for on-demand personalized printing thereof;
the printer configured to generate and provide a printed result for the print job into a container;
wherein the ordering application is configured for personalization of the print job responsive to the print order including a personal identification number for unlocking the container;
wherein the ordering application is configured to allow the print order to include an attachment document or design for the personalization of the print job in flight for the on-demand personalized printing;
the drone configured to obtain and hold the container for airborne delivery of the printed result to an address associated with the print order; and
wherein the mothership is an airship with an aerodrome-like bay for the drone.

2. The system according to claim 1, wherein:
the communications server is configured to generate a confirmation responsive to the print order and to send the confirmation via the network to the ordering application;
the container includes a programmable electronic locking mechanism for locking the printed result in the container; and
the personal identification number is included in the confirmation for the print job and is a code for unlocking the programmable locking mechanism via the ordering application.

3. The system according to claim 2, wherein the client device is a mobile phone.

4. A system, comprising:
a client device having an ordering application;
an airborne mothership having an unmanned aerial vehicle ("drone"), a printer and a communications server;
the drone and the printer coupled to one another;
the communications server in communication with a network and configured to receive a print order from the ordering application via the network;
the communications server in wireless communication with the printer to provide a print job to the printer responsive to the print order for on-demand personalized printing thereof;
the printer configured to generate a printed result for the print job and provide the printed result for the print job into a container;
wherein the ordering application is configured for personalization of the print job responsive to the print order including a personal identification number for unlocking the container;
wherein the ordering application is configured to allow the print order to include an attachment document or design for the personalization of the print job in flight for the on-demand personalized printing;
the drone configured for airborne delivery of the printer to an address associated with the print order; and
wherein the mothership is an airship with an aerodrome-like bay for the drone.

5. The system according to claim 4, wherein:
the communications server is configured to generate a confirmation responsive to the print order and to send the confirmation via the network to the ordering application;
the container includes a programmable electronic locking mechanism for locking the printed result in the container; and
the personal identification number is included in the confirmation for the print job and is a code for unlocking the programmable locking mechanism via the ordering application.

6. The system according to claim 5, wherein the code is viewable on a mobile device via the ordering application.

7. A method, comprising:
providing an airborne mothership having a printer, an unmanned aerial vehicle ("drone"), a container loader, and a communications server;
communicating over a network by a client device having an ordering application to obtain a print order;
sending the print order from the network to the communications server;
generating print data for the print order to provide a print job;
on-demand personalized printing with the printer the print job to provide a printed result;
loading the printed result into a container with the container loader;
creating delivery instructions responsive to the print order;
sending the delivery instructions to the drone;
loading the container into the drone;
wherein the ordering application is configured for personalization of the print job responsive to the print order including a personal identification number for unlocking the container;
wherein the ordering application is configured to allow the print order to include an attachment document or design for the personalization of the print job in flight for the on-demand personalized printing;
airborne delivering of the container with the printed result by the drone in accordance with the delivery instructions; and
wherein the mothership is an airship with an aerodrome-like bay for the drone to take off therefrom for the airborne delivering and land thereto after the airborne delivering.

8. The method according to claim 7, further comprising:
obtaining the print order among a plurality of print orders from a plurality of client devices by a cloud application to generate order data;
determining sub-regions for a region responsive to the order data; and
dispatching the mothership having the printer to a sub-region of the region.

9. The method according to claim 8, further comprising:
determining a central area for the sub-region responsive to the order data; and
wherein the dispatching of the mothership is to the central area.

10. The method according to claim 7, further comprising:
authenticating the print order for a user account with the ordering application; and
after authentication, generating the print order with the ordering application.

11. The method according to claim 10, wherein the ordering application is configured to receive print options for generation of the print order.

12. The method according to claim 10, further comprising:
creating the personal identification number for the print job;
transferring the personal identification number to a cloud application;
augmenting the personal identification number with an expiration; and
confirming the personal identification number to the ordering application and the communication server.

13. The method according to claim 12, further comprising setting an electronic locking mechanism of the container with the personal identification number.

14. The method according to claim 13, further comprising locking the electronic locking mechanisms with the printed result in the container.

15. The method according to claim 7, wherein the ordering application is configured for on-demand personalization of the print job.

* * * * *